(12) United States Patent
Koren

(10) Patent No.: US 6,808,154 B2
(45) Date of Patent: Oct. 26, 2004

(54) MOLD AND MOLDING PROCESS

(75) Inventor: Robert Douglas Koren, Cary, NC (US)

(73) Assignee: Column & Post., Inc., Apex, NC (US)

( * ) Notice: Subject to any disclaimer, the term of this patent is extended or adjusted under 35 U.S.C. 154(b) by 540 days.

(21) Appl. No.: 09/814,509

(22) Filed: Mar. 22, 2001

(65) Prior Publication Data

US 2002/0135090 A1 Sep. 26, 2002

(51) Int. Cl.[7] ................................................ B29C 39/36
(52) U.S. Cl. ......................... 249/63; 249/127; 249/142; 249/178; 249/183; 425/440
(58) Field of Search ............................. 249/48, 57, 63, 249/65, 127, 142, 178, 183; 425/438, 440, DIG. 44, DIG. 112

(56) References Cited

U.S. PATENT DOCUMENTS

| | | | | |
|---|---|---|---|---|
| 840,637 A | * | 1/1907 | Locher | |
| 925,009 A | * | 6/1909 | Millam | |
| 3,072,995 A | * | 1/1963 | Buxton | 264/314 |
| 3,104,441 A | * | 9/1963 | Smith | |
| 3,290,728 A | * | 12/1966 | Pratt | 425/522 |
| 3,550,897 A | * | 12/1970 | Herro | |
| 3,768,769 A | * | 10/1973 | Sachs | |
| 3,822,106 A | * | 7/1974 | Bonet | 425/84 |
| 3,891,022 A | * | 6/1975 | Cola | |
| 3,980,269 A | * | 9/1976 | Maurino et al. | |
| 4,119,695 A | * | 10/1978 | Asserback | 264/314 |

* cited by examiner

Primary Examiner—James P. Mackey
Assistant Examiner—Donald Heckenberg
(74) Attorney, Agent, or Firm—Coats & Bennett, P.L.L.C.

(57) ABSTRACT

A method and apparatus for forming a member, such as a column. The invention comprises inner and outer molds that are spaced apart forming a cavity for receiving a viscous material for making the member. A core is inserted within the inner area of inner mold when the viscous material is initially disposed within the mold. Once the material attains a gelled state, an extraction member is inserted within the inner area. A vacuum is applied to the inner area that causes the flexible inner mold to separate from the material and conform to the extraction member allowing for removal.

18 Claims, 6 Drawing Sheets

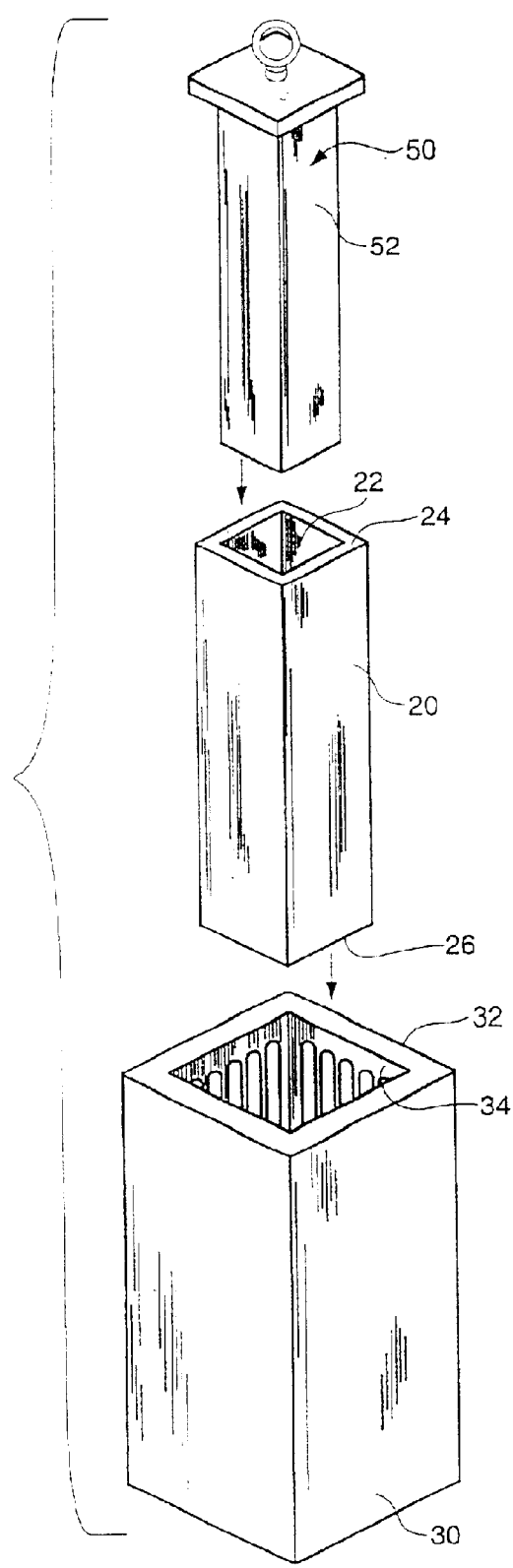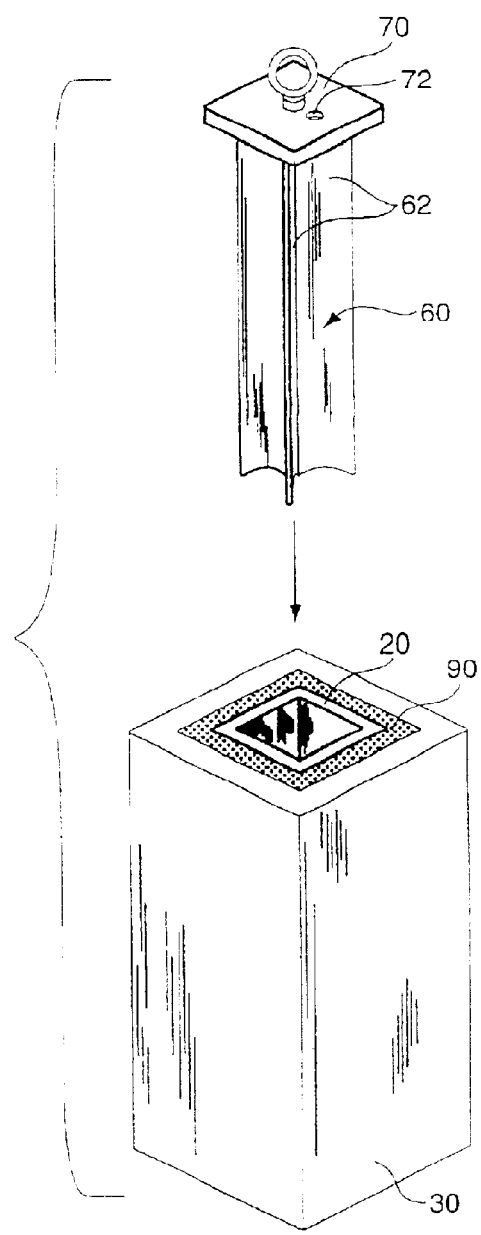
FIG. 1A
FIG. 1B

MOLD AND MOLDING PROCESS

BACKGROUND OF THE INVENTION

The present invention is directed to an apparatus and process for making molded columns and, more particularly, to a two piece mold for making columns.

In recent years, molded columns have been used in place of wooden columns in residential construction. Molded columns have a number of advantages, such as lower costs, a variety of shapes, structural strength, etc. Various types of molding processes have been used to make columns.

One molding process currently used is to provide an elongated mold having a hollow cavity. Viscous material is poured into a mold cavity and the mold is spun at high speed to force the molding material against the inner surface of the mold. This process is known as centrifugal casting and works well for columns with a circular cross-section, but is not well-suited for square or rectangular columns. In the case of a square column for example, the material accumulates in the corners of the column. Thus a square column will have overly thick corners that use an excessive amount of material and will have thin walls between the corners that may have inadequate strength characteristics.

Another molding process includes forming a cavity between outer and inner molds in which at least the inner mold is constructed of a flexible material. The viscous material is poured within the cavity and given time to gel. The inner mold must be removed because the material shrinks during the gelling and curing stages. To accomplish this, a vacuum is applied to an interior of the inner mold causing it to contract inward away from the gelled member. The contracted inner mold may then be removed allowing the material to continue curing and gelling. However, the inner mold folds inward upon itself when the vacuum is applied becoming wedged within the gelled member. This may result in the member becoming damaged while the inner mold is being extracted, or may cause excessive wear on the inner mold resulting in a shorten usable life.

SUMMARY OF THE INVENTION

The present invention is directed to a mold and a molding process for forming elongated columns. A cavity is created between an outer mold and a flexible inner mold in which a molding material is poured that creates the column. During the curing process, an extraction member is placed within the flexible inner mold and a vacuum is applied remove air from within the inner mold. The vacuum causes the inner mold to contract inward away from the molding material and adhere to the extraction member. At this point, both the extraction member and the inner mold may be removed and the molding material remains in the outer mold and cures to a hardened state.

The extraction member has a surface area that is larger than that of the inner mold. This larger size causes the inner mold to adhere to the extraction member without folding or collapsing upon itself when the vacuum is applied and become stuck within the molding material.

The extraction member may have a variety of shapes and configurations. In one embodiment, the extraction member is cruciform shape with a plurality of arms extending outward from a center section. The arms extend into corners of the inner mold to provide support and give shape during the initial molding process when the molding material is still in a viscous state. The extraction member may further include apertures such that air is removed from all sections of the hollow interior of the inner mold when the vacuum is applied. Other extraction member configurations include diamond shaped, and rectangular shape. The sides of the extraction member may further be substantially straight, or may be curved. The outer and inner molds may have a variety of shapes, including substantially rectangular and substantially circular.

BRIEF DESCRIPTION OF THE DRAWINGS

FIG. 1A is an exploded view illustrating the inner and outer molds and the core piece inserted within the inner mold;

FIG. 1B is an exploded view illustrating the extraction member inserted within the inner mold;

DETAILED DESCRIPTION OF THE INVENTION

Figure 2:
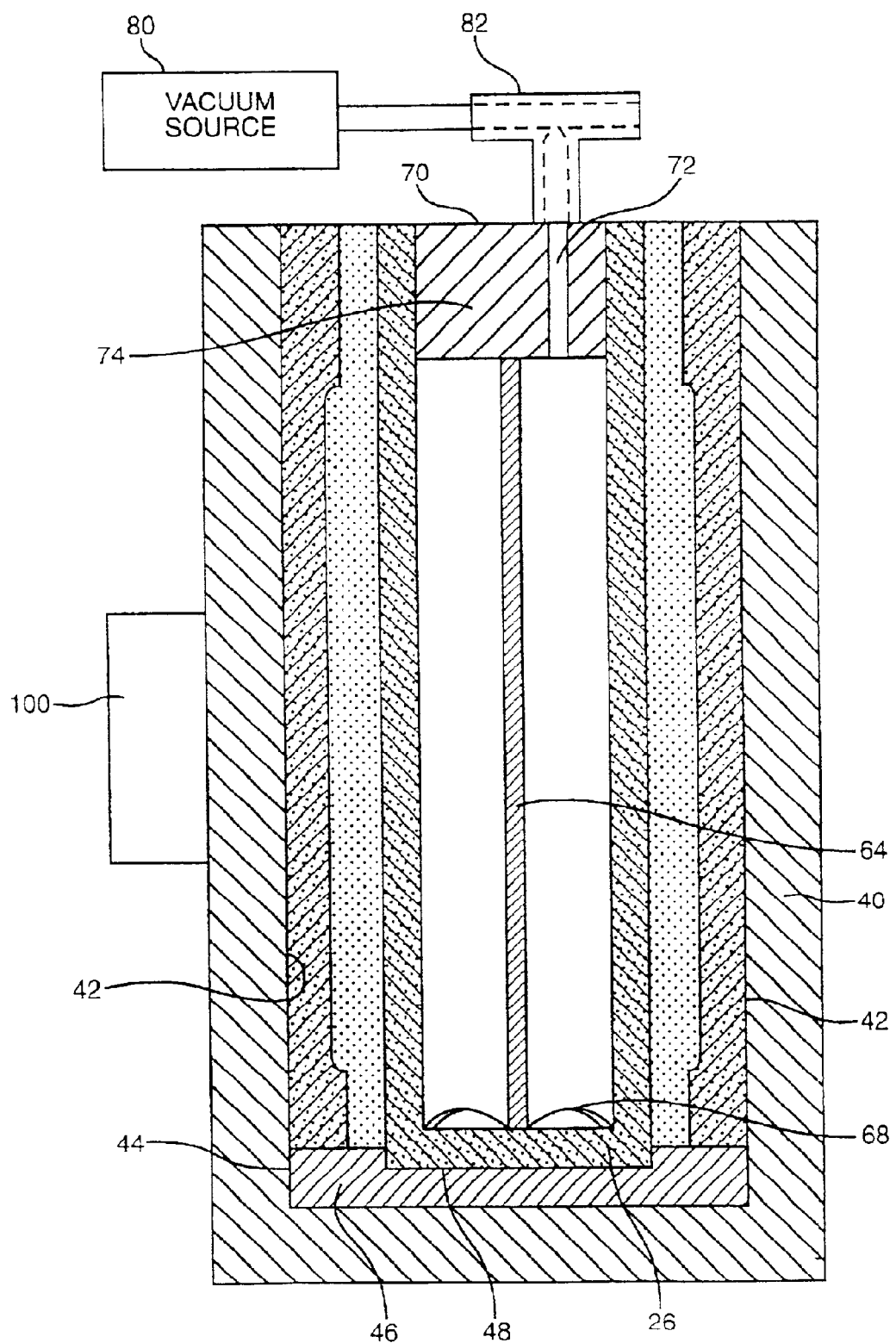
FIG. 2 is a vertical cross-sectional view illustrating the column formed between the inner and outer mold and the extraction member inserted within the inner mold.

The present invention is directed to a method and apparatus for molding an elongated member, such as a column. As illustrated in FIG. 1A, the apparatus comprises an inner mold 20 and an outer mold 30 that are spaced apart forming a cavity 25 (FIG. 3) in which the column is formed. A core piece 50 is positioned within an interior 22 of the inner mold 20 to support the inner mold 20 while the column is being cast. Molding material 90 is poured into the cavity 25 to form the column. The molding material 90 is initially in a viscous state to fill the entire cavity 25 and becomes semi-hardened in a gelled state after a period of time. At this time, the core piece 50 is removed and an extraction member 60 (FIG. 1B) is inserted within the interior of the inner mold 20. A vacuum is applied to the interior 22 of the inner mold 20 causing the inner mold 20 to collapse and conform to the extraction member 60 allowing removal of the inner mold 20.

Outer mold 30 forms the outer edge of the molded member and comprises an outer surface that 32 contacts a housing 40 and an inner surface 34 that shapes the molding material 90. Inner surface 34 may comprise flutes, channels, grooves, and other configurations for forming decorative ornamentation on the outer surface of the column. In one embodiment, outer mold 30 has an elongated rectangular shape that is split along one side such that it may be removed from the column when the molding process is complete. Outer mold 30 may be constructed of a variety of materials, such as silicon rubber which is flexible providing for ease in manipulation during the molding process. The thickness of the outer mold 30 may vary, as well as the shape and configuration.

Inner mold 20 is positioned within the outer mold 30 forming the cavity 25 that is filled with molding material 90 to form the column. Inner mold 20 comprises a continuous wall 24 with an integral bottom 26. The interior 22 of the inner mold 20 is open at one end to receive the core piece 50 and extraction member 60 as will be described below. In one embodiment, inner mold 20 has an elongated rectangular shape roughly corresponding to the outer mold 30. The inner mold 20 may be constructed from a variety of flexible materials such as silicon rubber and the wall thickness may vary. One skilled in the art will understand that other dimensions and sizes are also contemplated by the present invention.

Figure 3:
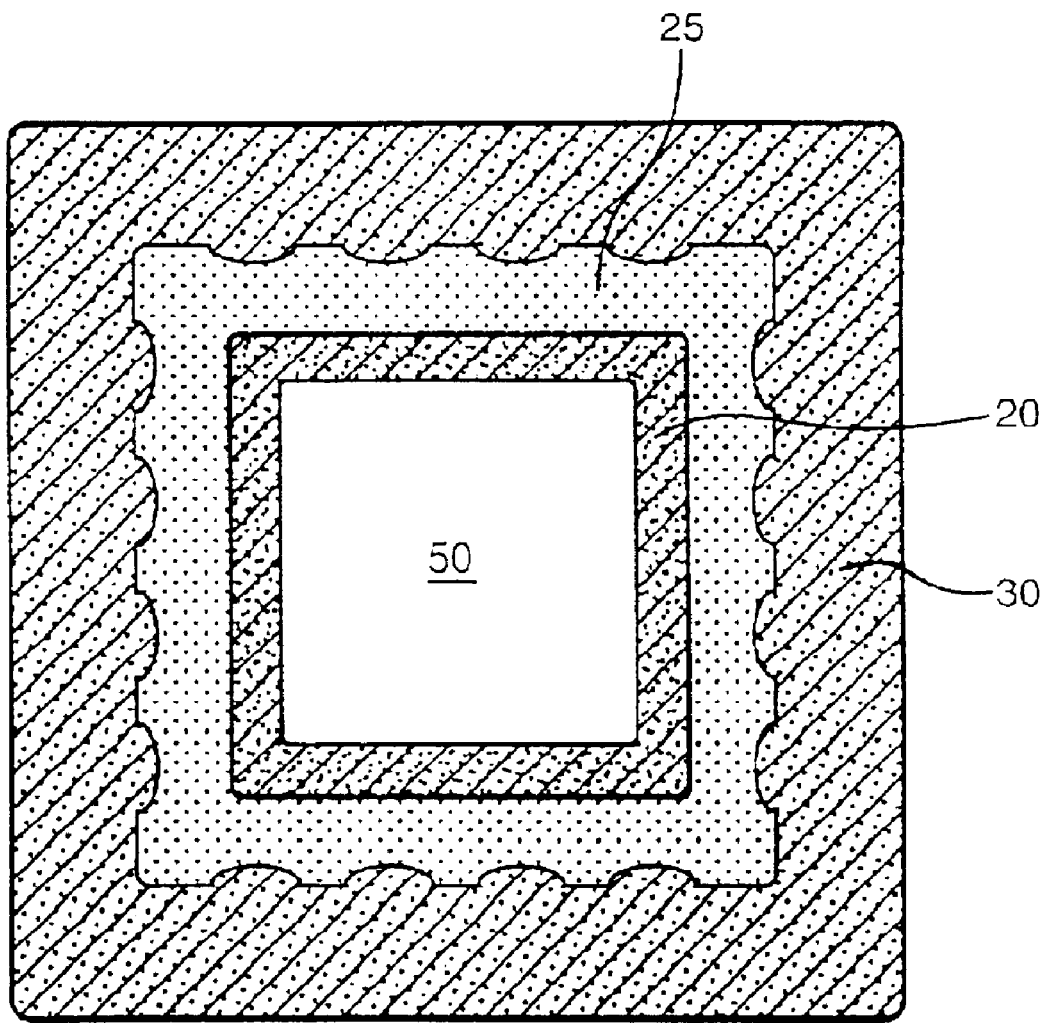
FIG. 3 is a cross-sectional view of the mold used to form a column illustrating the core inserted within the inner mold.

Core piece 50 is placed within the interior 22 of the inner mold 20 during the molding process. Core piece 50 is an elongated rigid member with outer surfaces 52 that press against the inner surface of the flexible inner mold 20. The core piece 50 is sized to have a surface area approximately equal to the inner surface of the inner mold 20 such that the inner mold 20 conforms to the core piece 50. As illustrated in FIG. 3, the core piece 50 supports the flexible inner mold 20 and prevents the molding material 90 from collapsing the inner mold 20 during the molding process. In one embodiment, the core piece 50 is made of wood with a gloss formica laminate on the exterior. The gloss formica laminate reduces the friction with the inner surface of the inner mold 20 to ease insertion and removal of the core piece 50. The laminate surface may further be treated with a lubricant, such as CRISCO, to further ease the removal of the core piece 50.

The inner area 22 of the inner mold 20 and the core piece 50 may have tapered configurations with the width at the top of the area being larger than the width at the bottom. The taper aids in removing the core piece 50 from the inner area 22 during the molding process. In one embodiment, the taper has about a two degree draft although other amounts may also be used.

Extraction member 60 is used to extract the inner mold 20 from the molded column after the molded material gels, but before it completely hardens. Extraction member 60 may have a variety of shapes such as a plurality of arms 62 extending radially outward from a common center section 64 as illustrated in FIGS. 1B, 2, 4, and 6. The arms 62 extend into the corners of the inner mold 20 and may include rounded corners to prevent tearing of the inner mold 20. The bottom of the extraction member includes divots 68 that are angled inward such that the length exceeds the length of the inner mold bottom 26. In one embodiment, the arms 62 are slightly shorter and do not extend completely into the corners of the inner mold 20. In this embodiment, when the vacuum is applied, the inner mold 20 may pull the corners inward away from the gelled material to ease removal of the inner mold 20.

Figure 4:
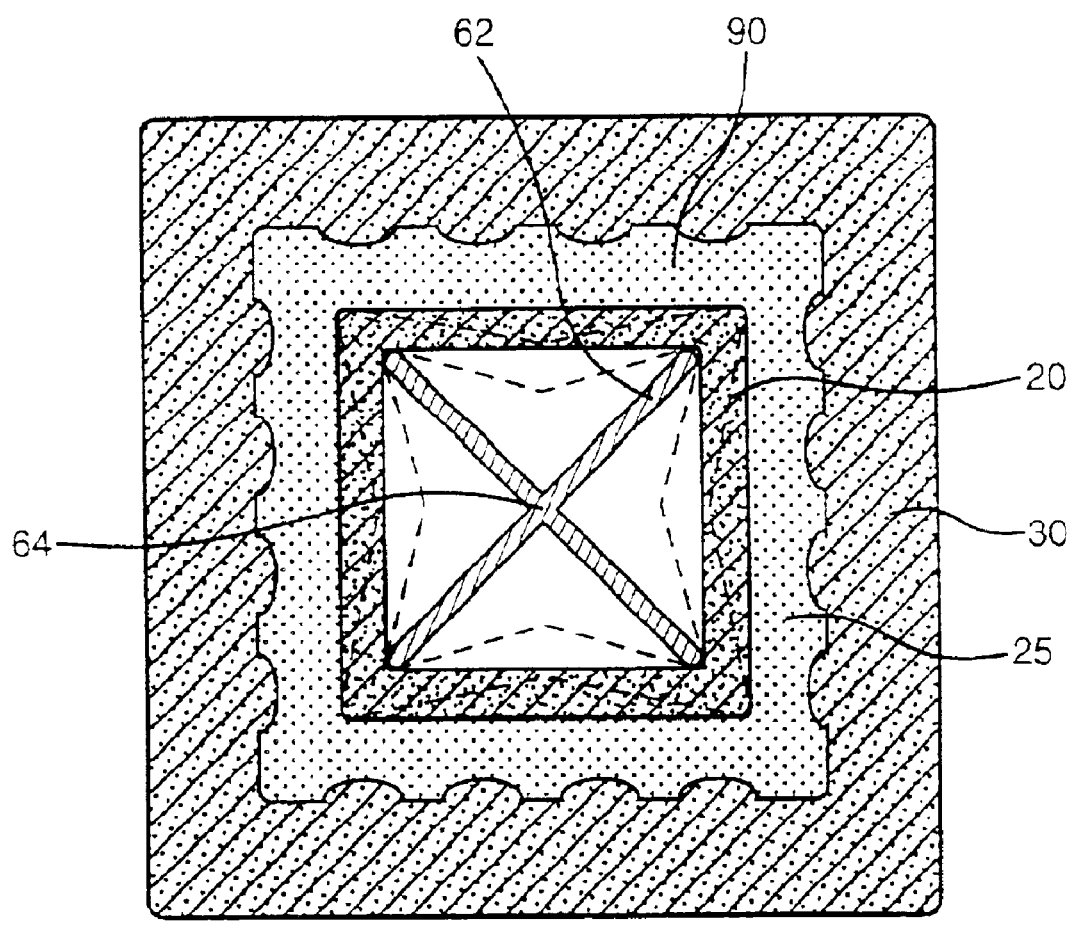
FIG. 4 is a cross-sectional view of the mold used to form a column illustrating the extraction member inserted within the inner mold and the position of the inner mold when the vacuum is applied.
Figure 5A:
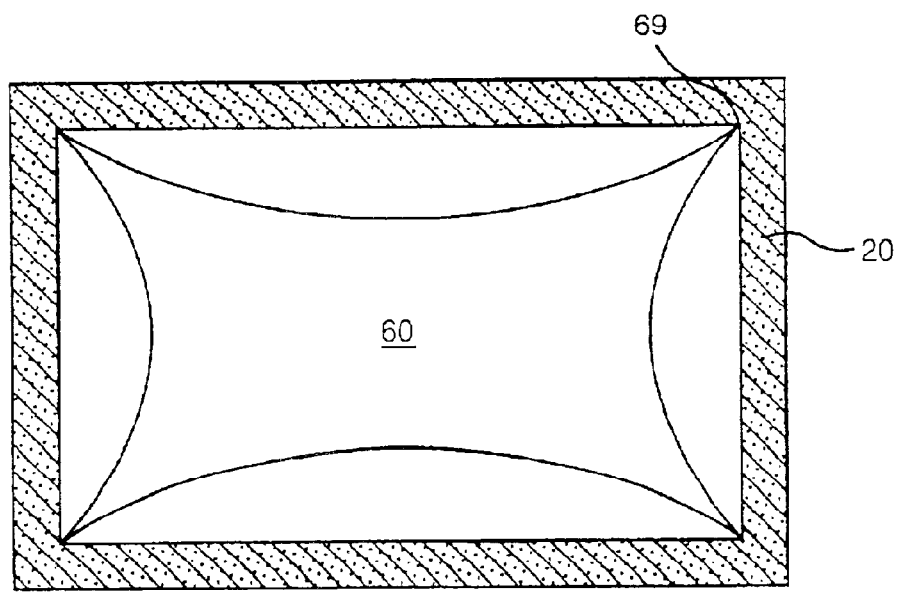
FIG. 5A is a cross-sectional view illustrating an alternative embodiment of the extraction member.
Figure 5B:
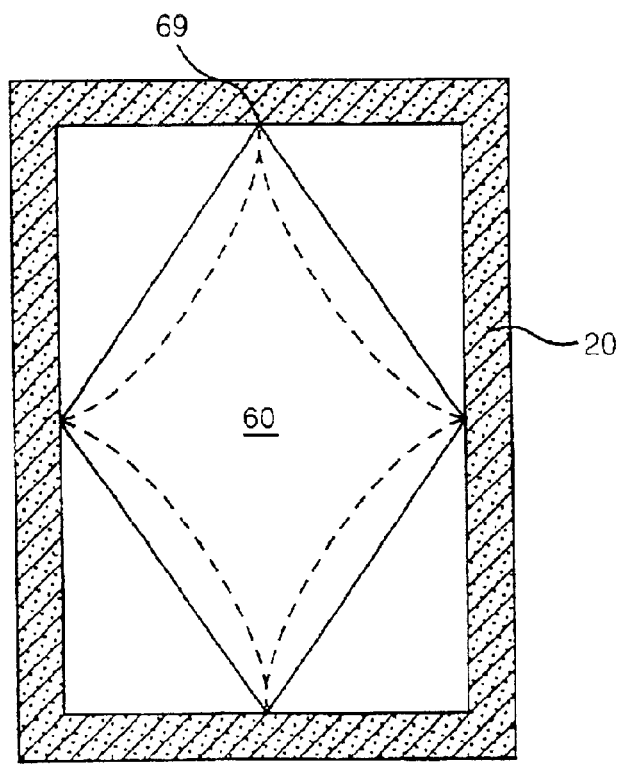
FIG. 5B is a cross-sectional view illustrating another embodiment of the extraction member.
Figure 6:
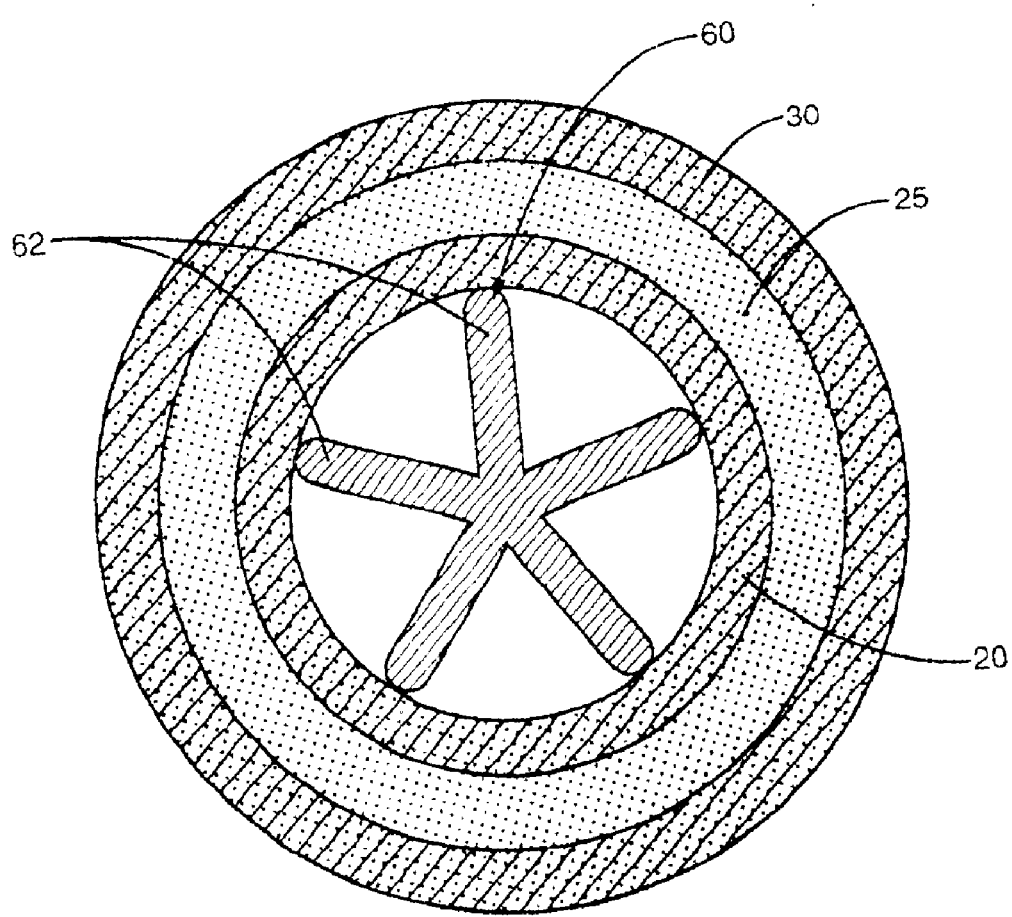
FIG. 6 is a cross-sectional view illustrating another embodiment of a circular inner and outer mold with an extraction member inserted within the inner mold.

The extraction member 60 may include arms 62 that are substantially straight forming an "X-shape" such as illustrated best in FIG. 4. Another embodiment illustrated in FIG. 5A includes curved sides that align with the sides of the inner mold 20. Curved sides include points 69 that extend into the corners of the inner mold 20. Another embodiment illustrated in FIG. 5B features points 69 that contact middle sections of the inner mold that do not extend into the corners. The edges may be substantially straight as illustrated by the solid lines, or may be curved as illustrated by the dashed lines. FIG. 6 illustrates an extraction member 60 having five arms 62 that contact along the circumference of the inner mold 20.

In each of the embodiments, the surface area of the extraction member 60 is greater than the surface area of the inner mold 20. The larger surface area enables the inner mold 20 to collapse inward under a vacuum and adhere to the extraction member 60 as illustrated in the embodiment illustrated in FIG. 4. The regions formed between the arms 62 and center section 64 form folding regions in which the inner mold 20 folds inward away from the gelled material 90. If the surface area of the extraction member 60 were smaller than the inner mold 20, or if no extraction member 60 was inserted, the inner mold 20 would fold upon itself resulting in it becoming wider and being jammed within the interior 22 of the inner mold 20. Stated in another manner for the embodiment of FIG. 4, a length formed from a first arm end to the center section and outward to an adjacent arm end is greater than a length of an inner surface of the inner mold between two corners. Extraction member 60 may also be tapered similar to the core piece 50 to conform to the dimensions of the inner area 22.

A top 70 covers the open end of the inner mold 20 to prevent air from entering into the inner area 22 when the vacuum is applied. The top 70 may further extend across the top edge of the cavity 25 and outer mold 30. A duct 72 extends through the top 70 through which air is removed via a vacuum source 80 from the inner area 22. The duct 72 communicates with the interior 22 of the inner mold 20 to create and maintain a vacuum when the inner mold 20 is being removed from the molded part. In one embodiment illustrated in FIG. 1B, top 70 is attached to an end of the extraction member 60. In an alternative embodiment illustrated in FIG. 2, top 70 is a separate element that is inserted within the inner mold 20 after the extraction member 70 has been inserted. In this embodiment, the top 70 may further include an insert section 74 that extends outward from the top 70 and is sized to fit within the inner mold 20.

A vacuum source 80 connects to duct 72 to remove air from within the interior 22 of the inner mold 20. In one embodiment, vacuum source is a pressurized air hose connected to a valve having a venturi. The air source is attached to the valve 82 which pulls the air from the interior 22 through the duct 72.

A housing 40 may extend around the outer mold 30 as illustrated in FIG. 2. In one embodiment, housing 40 has a two-piece construction comprising substantially similar first and second sections. Each of the sections includes an inner wall 42 that conforms approximately to the dimensions of the outer mold 30. When the sections are placed together, the inner walls align to complement each other and surround the entire outer surface of the outer mold 30. The sections may be connected in a variety of manners, such as with a hasp clamp.

Each of the sections may further include a channel 44 spaced along a lower edge to receive an indexer 46. In one embodiment, indexer 46 has a substantially rectangular outer edge to mount within the channel 44. Indexer 46 further includes a recessed section 48 sized to receive the bottom 26 of the inner mold 20. The recessed section 48 ensures that the inner mold 20 is aligned properly within the outer mold 30. Indexer 46 may be constructed of a variety of materials, such as polyethylene, nylon, and aluminum.

A variety of materials 90 may be used for forming the column. The material 90 has an initial viscous state having a consistency to be poured into and fill the cavity 25. The material 90 then goes through a gelled state in which it begins to harden before finally achieving a cured state in which it is hardened. The material 90 shrinks as it progresses through the gelled and cure states therefore requiring that the inner mold 20 be removed to ensure it does not become entrapped within the shrinking material 90. In one embodiment, the material 90 comprises about twenty-one pounds of polyester resin, about thirty-one pounds of marble dust, about one hundred and forty grams of polymer spheres, and about one percent catalyst, such as methyl ethyl ketone peroxide (MEKP). In this embodiment, the material 90 is in the initial viscous state for about two to three minutes, is in the gelled state for about four to five minutes, and then begins to cure and harden. The amount of time in which the material 90 maintains these separate states is important for the molding process. When initially poured into the cavity 25, air becomes trapped in the material 90 and may cause defects in the column if not removed. To facilitate removal, a vibrator 100, such as a pneumatic vibrator, may be attached to the housing 40 to vibrate the material 90 and remove the air. If the material 90 changes to the gelled state too quickly, there is not adequate time to remove the air. Likewise, the gelled state should not be too quick to prevent the core piece 50, extraction member 60 and inner mold 20 from being removed.

The molding process begins with the indexer 46 being placed within the housing 40 and then aligning the inner and outer molds 20, 30. The recessed area 48 of the indexer 46 is sized to receive the bottom 26 of the inner mold 20 to align the inner mold 20 within the outer mold 30. The core piece 50 may be inserted within the inner mold 20 either before or after this alignment. Once the molds 20, 30 are properly aligned the molding material 90 is poured into the cavity 25. The cavity 25 may be vibrated to remove any air bubbles trapped within the material 90 and ensure the entire cavity 25 is filled with molding material 90.

After the molding material 90 has reached the gelled state, in which it has enough stability to stay against the inner surface 34 of the outer mold 30, the core piece 50 is removed from within the interior 22 of the inner mold 20 and the extraction member 60 is inserted. The top 70 is placed over the inner mold 20 to seal the interior 22 and a vacuum is applied to remove the air from the interior of the inner mold 20. The vacuum pulls the inner mold 20 away from the molded part and against the extraction member 60 as illustrated by the dashed lines of FIG. 4. Because the surface area of the extraction member 60 is larger than the surface area of the inner mold 20, the inner mold 20 does not fold upon itself such that it would become wedged within the inner mold 20. The inner mold 20 and extraction member 60 are then removed from the molded piece. Provided the inner mold 20 abuts against the top 70 and seals or restricts the amount of air entering into the inner area 22, the inner mold 20 and extraction member 60 will remain together as the inner mold 20 is pulled out of the molded part.

The present invention may be used for making elongated members having a variety of shapes. FIGS. 1A, 1B, 3, and 4 illustrate a rectangular member. FIG. 6 illustrates inner 20 and outer 30 molds for constructing a member having a circular cross section. The outer surface of the inner mold 20 approximately conforms to the inner surface of the outer mold 30 forming a cavity 25. Extraction member 60 having a plurality of arms 62 is sized to fit within the inner mold 20.

The present invention may be carried out in other specific ways than those herein set forth without departing from the spirit and essential characteristics of the invention. In one embodiment, the mold forms an elongated member, such as a column as illustrated in the Figures. However, the invention is applicable to forming members having various dimensions and sizes. Another embodiment features apertures within the interior of the extraction member arms to ensure that air is removed from throughout the inner area.

The present embodiments are, therefore, to be considered in all respects as illustrative and not restrictive, and all changes coming within the meaning and equivalency range of the appended claims are intended to be embraced therein.

What is claimed is:

1. A device for molding hollow parts, said device comprising:
   a) an outer mold;
   b) a flexible inner mold spaced inward of said outer mold, said flexible inner mold comprising a hollow interior;
   c) a rigid core piece insertable into said hollow interior of said inner mold during a forming step of the molding process to hold the inner mold in engagement with the hollow part and to prevent the inner mold from collapsing inward during the forming step;
   d) an extraction member insertable into said hollow interior of said inner mold during an extraction step of the molding process to extract the inner mold from the hollow part after the hollow part is formed; and
   e) a vacuum source to apply a vacuum to said hollow interior of said inner mold to collapse said inner mold against a surface of said extraction member while the inner mold is extracted from the hollow part.

2. The device of claim 1, wherein a bottom edge of said extraction member has a larger surface area than a surface area of a bottom of said inner mold.

3. The device of claim 1, wherein said hollow interior of said inner mold and said extraction member are tapered along their respective lengths.

4. The device of claim 1, further comprising a top positioned across an upper surface of the inner mold and comprising a duct leading between said hollow interior and said vacuum source.

5. The device of claim 1, wherein said extraction member has arms that extend against said inner mold.

6. The device of claim 1, wherein said extraction member has a substantially diamond-shape.

7. The device of claim 1, wherein said extraction member has curved sides.

8. The device of claim 1, wherein said inner and outer molds have a rectangular shape.

9. The device of claim 1, wherein said inner and outer molds have a circular shape.

10. A device for molding a hollow part, said device comprising:
    a) an outer mold having a square cross sectional shape;
    b) an inner mold having a square cross sectional shape positioned within said outer mold, said inner mold comprising a hollow interior;
    c) a rigid core piece insertable into said hollow interior of said inner mold during a forming step of the molding process to hold the inner mold in engagement with the hollow part during a molding step and to prevent the inner mold from collapsing inward; during the molding step:
    d) an extraction member insertable into said hollow interior of said inner mold during an extraction step of the molding process to extract the inner mold from the hollow part after the hollow part is formed, said extraction member comprising a plurality of radial members extending outward from a center section into each corner of said hollow interior, said radial members forming folding regions adjacent to each side of said inner mold; and
    e) a vacuum source in communication with said hollow interior to collapse said inner mold against a surface of said extraction member while the inner mold is extracted from the hollow part.

11. The device of claim 10, wherein said extraction member comprises four radial members and four folding regions.

12. The device of claim 10, wherein said extraction member has a substantially cruciform shape.

13. The device of claim 10, wherein said radial arms have rounded outer edges that contact said inner mold.

14. The device of claim 10, wherein said extraction member further comprises a top having an duct that extends between said vacuum source and said hollow interior.

15. The device of claim 10, further comprising an outer housing extending around an exterior of said outer mold, said outer housing having an indexer with a recessed section for positioning a bottom of said inner mold to align said inner mold within said outer mold.

16. The device of claim 10, wherein said extraction member has a larger surface area than said hollow interior.

17. The device of claim 1 wherein an inner surface of the inner mold and an outer surface of the core piece are tapered to facilitate removal of the core piece from the inner mold following the molding step.

18. The device of claim 10 wherein an inner surface of the inner mold and an outer surface of the core piece are tapered to facilitate removal of the core piece from the inner mold following the molding step.

* * * * *